(12) United States Patent
An (10) Patent No.: US 11,643,087 B2
(45) Date of Patent: May 9, 2023

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventor: Chiyoung An, Cheongju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 34 days.

(21) Appl. No.: 17/366,531

(22) Filed: Jul. 2, 2021

(65) Prior Publication Data

US 2022/0055632 A1 Feb. 24, 2022

(30) Foreign Application Priority Data

Aug. 18, 2020 (KR) .................. 10-2020-0103493

(51) Int. Cl.
| | |
|---|---|
| *G08B 23/00* | (2006.01) |
| *B60W 40/09* | (2012.01) |
| *B60W 40/105* | (2012.01) |
| *B60W 50/14* | (2020.01) |
| *B60W 10/20* | (2006.01) |
| *B60W 50/00* | (2006.01) |

(52) U.S. Cl.
CPC ............ *B60W 40/09* (2013.01); *B60W 10/20* (2013.01); *B60W 40/105* (2013.01); *B60W 50/14* (2013.01); *B60W 2050/0054* (2013.01); *B60W 2510/205* (2013.01); *B60W 2540/18* (2013.01); *B60W 2540/229* (2020.02)

(58) Field of Classification Search
CPC .... B60W 40/09; B60W 10/20; B60W 40/105; B60W 50/14; B60W 2050/0054; B60W 2510/205; B60W 2540/18; B60W 2540/229; B60W 40/08; B60W 2040/0818; B60W 2040/0827; B60W 2520/10; B62D 6/002
USPC ................. 340/576, 575, 573.1, 426.31, 439
See application file for complete search history.

(56) References Cited

U.S. PATENT DOCUMENTS

| | | | | |
|---|---|---|---|---|
| 6,262,657 | B1* | 7/2001 | Okuda ................. | B60K 28/066 340/576 |
| 2014/0032051 | A1* | 1/2014 | Ezoe ..................... | B62D 6/001 701/42 |
| 2019/0009818 | A1* | 1/2019 | Ide ....................... | B62D 15/024 |
| 2019/0337531 | A1* | 11/2019 | Oe ........................ | B60K 35/00 |
| 2020/0079366 | A1* | 3/2020 | Higashitani ........... | B60W 40/08 |
| 2021/0049908 | A1* | 2/2021 | Pipe ..................... | G08G 1/0112 |

FOREIGN PATENT DOCUMENTS

KR 10-1601558 B1 3/2016

* cited by examiner

*Primary Examiner* — Anh V La
(74) *Attorney, Agent, or Firm* — Morgan, Lewis & Bockius LLP

(57) ABSTRACT

A vehicle may include a steering angle sensor; and a controller configured to be electrically connected to the steering angle sensor. The controller may be configured to identify a change amount in a steering angular speed of the vehicle according to an output of the steering angle sensor, and to identify careless driving of a driver of the vehicle according to a first maximum change amount in which the steering angular speed changes in a first direction and a second maximum change amount in which the steering angular speed changes in a second direction.

17 Claims, 4 Drawing Sheets

VEHICLE AND METHOD OF CONTROLLING THE SAME

CROSS-REFERENCE TO RELATED APPLICATION(S)

The present application claims priority to Korean Patent Application No. 10-2020-0103493, filed on Aug. 18, 2020, the entire contents of which is incorporated herein for all purposes by this reference.

BACKGROUND OF THE INVENTION

Field of the Invention

The present invention relates to a vehicle and a method of controlling the vehicle.

Description of Related Art

A driver of a vehicle may be in a state of carelessness while driving a vehicle due to drowsiness or manipulation of a device such as a smartphone which is not related to driving of the vehicle, and this may cause an accident. Accordingly, in recent years, technologies for assisting the driver's safe driving have been developed for the safety of the driver and passenger of the vehicle. Among technologies for assisting safe driving, a driver attention warning (DAW) technology is a technology that determines whether the driver is in a careless state based on a behavior of a vehicle. The DAW technology is being applied to most vehicles released with the recent expansion of new safety technology.

However, the conventional DAW technology analyzes a simple driving state of the vehicle to determine the driver's careless driving, and there has been a problem that the reliability of the driver's careless driving determination is not high.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle configured for determining a driver's careless driving with improved reliability compared to a related art, and a method of controlling the vehicle.

Additional aspects of the present invention will be set forth in part in the description which follows, and in part, will be obvious from the description, or may be learned by practice of the present invention.

According to various aspects of the present invention, there is provided a vehicle including: a steering angle sensor; and a controller configured to be electrically connected to the steering angle sensor. The controller may be configured to identify a change amount in a steering angular speed of the vehicle according to an output of the steering angle sensor, and to identify careless driving of a driver of the vehicle according to a first maximum change amount in which the steering angular speed changes in a first direction and a second maximum change amount in which the steering angular speed changes in a second direction.

The controller may be configured to identify whether the steering angle of the vehicle is included in a first threshold range for a predetermined threshold time or more than the predetermined threshold time according to the output of the steering angle sensor while the vehicle is driving.

After the steering angle of the vehicle is included in the first threshold range for the predetermined threshold time or more than the predetermined threshold time, the controller may be configured to identify that a driving of the vehicle by the driver is the careless driving according to the first maximum change amount of the steering angular speed of the vehicle exceeding a first threshold value depending on a current speed of the vehicle.

After the first maximum change amount of the steering angular speed of the vehicle, which exceeds the first threshold value depending on the current speed of the vehicle, the controller may be configured to identify that the driver's driving is the careless driving in a response to the second maximum change amount of the steering angular speed of the vehicle exceeding the first threshold value depending on the current speed of the vehicle.

The first threshold value may be configured to be determined based on the current speed of the vehicle, a predetermined first steering angular speed threshold value corresponding to a predetermined first speed of the vehicle, a predetermined second steering angular speed threshold value corresponding to a predetermined second speed of the vehicle, and the predetermined second speed.

The second maximum change amount may be greater than or equal to a multiple of a second threshold value of the first maximum change amount.

According to various aspects of the present invention, there is provided a method of controlling a vehicle including: identifying, by a controller, a change amount in a steering angular speed of the vehicle; and identifying, by the controller, careless driving of a driver of the vehicle according to a first maximum change amount in which the steering angular speed changes in a first direction and a second maximum change amount in which the steering angular speed changes in a second direction.

The method may further include identifying, by the controller, whether a steering angle of the vehicle is included in a first threshold range for a predetermined threshold time or more while the vehicle is driving. The identifying of the change amount in the steering angular speed of the vehicle may include performing the identifying of the change amount after the steering angle of the vehicle is included in the first threshold range for the predetermined threshold time or more.

The identifying of careless driving may include, after the steering angle of the vehicle is included in the first threshold range for the predetermined threshold time or more than the predetermined threshold time, performing the identifying of careless driving based on the first maximum change amount of the steering angular speed of the vehicle exceeding a first threshold value depending on a current speed of the vehicle.

The identifying of careless driving may include, after the first maximum change amount of the steering angular speed of the vehicle, which exceeds the first threshold value depending on the current speed of the vehicle, performing the identifying of careless driving in a response to the second maximum change amount of the steering angular speed of the vehicle exceeding the first threshold value depending on the current speed of the vehicle.

The first threshold value may be configured to be determined based on the current speed of the vehicle, a predetermined first steering angular speed threshold value corresponding to a predetermined first speed of the vehicle, a predetermined second steering angular speed threshold value corresponding to a predetermined second speed of the vehicle, and the predetermined second speed.

The second maximum change amount may be greater than or equal to a multiple of a second threshold value of the first maximum change amount.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals refer to like elements throughout the specification. Not all elements of the exemplary embodiments of the present invention will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections may not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the present invention will be described with reference to accompanying drawings.

Figure 1:
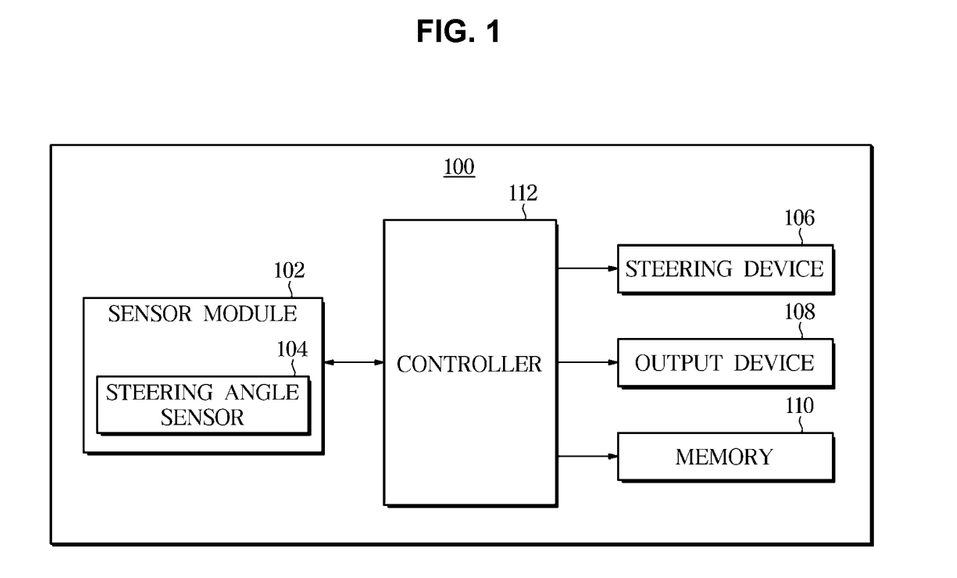
FIG. 1 is a block diagram of a vehicle according to various exemplary embodiments of the present invention.

FIG. 1 is a block diagram of a vehicle according to various exemplary embodiments of the present invention.

Referring to FIG. 1, a vehicle 100 may include a sensor module 102, a steering device 106, an output device 108, a memory 110 and/or a controller 112.

The sensor module 102 may include at least one sensor configured for generating an electrical signal or data value corresponding to an internal operating state of the vehicle 100 and/or an external environmental state.

The sensor module 102 may include a steering angle sensor 104 configured for detecting a steering angle of the vehicle 100. The steering angle is a movement angle at which the spindle of a steering wheel turns when the vehicle 100 changes a direction thereof, and may represent, for example, a maximum value of an internal wheel that the vehicle 100 turns.

The steering device 106 may change a driving direction of the vehicle 100. The steering device 106 may change the driving direction of the vehicle 100 in a response to a driver's steering operation through the steering wheel.

The output device 106 may output at least one piece of information based on a control of the controller 112. For example, the output device 106 may include a display apparatus and/or a speaker.

The memory 106 may store a variety of data used by at least one component (sensor module 102, steering device 106, output device 108, and/or controller 112) of the vehicle 100, for example, input data or output data for a software program and instructions related thereto. The memory 106 may include a volatile memory and/or a non-volatile memory.

The controller 112 (also referred to as a control circuit or processor) may include at least one other component of the connected vehicle 100 (e.g., a hardware component (e.g., the sensor module 102, the steering device 106, the output device 108 and/or the memory 110)) or a software component (software program)), and may perform various data processing and operations. The controller 112 may include the processor and the memory.

The controller 112 may identify a change amount in a steering angular speed of the vehicle 100 based on the output of the steering angle sensor 104. For example, the steering angular speed may be a value of a rotational angular speed of the steering wheel which may be determined by differentiating the steering angle obtained through the steering angle sensor 104. For example, the controller 112 may periodically control the steering angle sensor 104 to detect the steering angle. The controller 112 may identify whether the driver's driving of the vehicle 100 is careless driving based on the change amount in the steering angular speed of the vehicle 100. For example, the controller 112 may identify the driver's careless driving of the vehicle 100 based on a first maximum change amount in which the steering angular speed of the vehicle 100 changes in a first direction and a second maximum change amount in which the steering angular speed of the vehicle 100 changes in a second direction. For example, the controller 112 may identify whether a driving pattern of the driver of the vehicle 100 is an excessive steering pattern based on the change amount in the steering angular speed of the vehicle 100. When the driving pattern is the excessive steering pattern, the controller 112 may identify the driver's driving as a careless driving.

When the controller 112 identifies that the driver's driving is the careless driving, the controller 112 may control the output device 106 to output information for warning the driver's attention.

Figure 2:
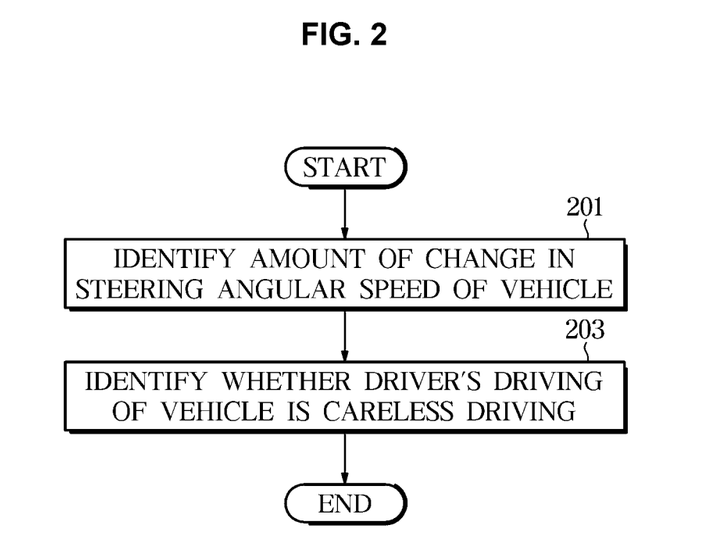
FIG. 2 is a flowchart of a vehicle control operation according to various exemplary embodiments of the present invention.
Figure 3:
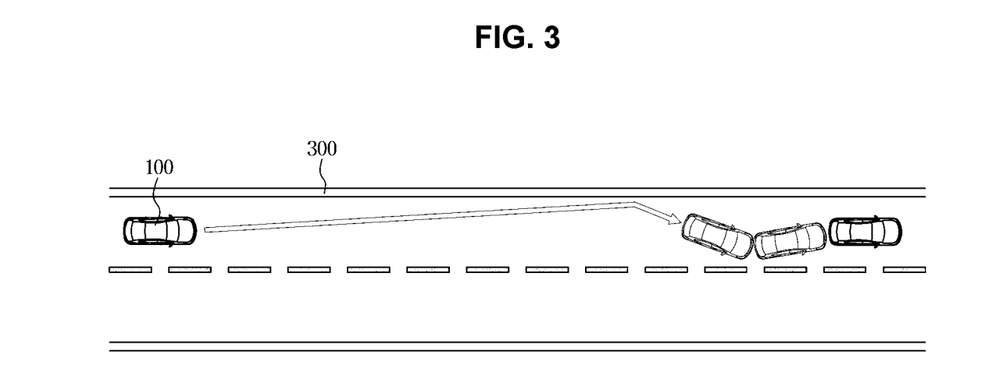
FIG. 3 is a view for describing careless driving of a driver of a vehicle according to various exemplary embodiments of the present invention.
Figure 4:
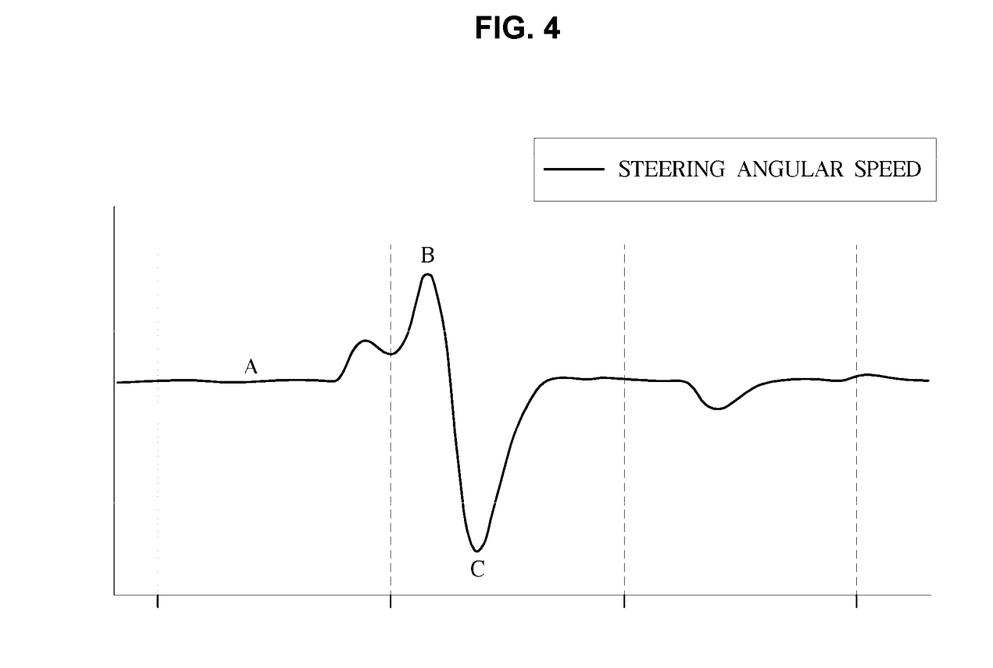
FIG. 4 is a view exemplarily illustrating a graph of a steering angular speed according to careless driving of a driver of a vehicle according to various exemplary embodiments of the present invention.

FIG. 2 is a flowchart of a vehicle control operation according to various exemplary embodiments of the present invention, FIG. 3 is a view for describing careless driving of a driver of a vehicle according to various exemplary embodiments of the present invention, and FIG. 4 is a view exemplarily illustrating a graph of a steering angular speed according to careless driving of a driver of a vehicle according to various exemplary embodiments of the present invention.

The vehicle 100 may identify the change amount in the steering angular speed of the vehicle 100 (201).

Referring to FIG. 3, when the driver is drowsy or careless while driving the vehicle 100, the steering wheel of the vehicle 100 hardly moves, and as the vehicle 100 moves in a direction outside of the lane 300, which is a direction in which the vehicle 100 leaves the lane 300 as illustrated in FIG. 3, the vehicle 100 may attempt to or leave the lane 300. When recognizing the present fact late, to adjust the direction of the vehicle 100 so that the vehicle 100 can safely drive within the lane 300, most of the drivers manipulate the steering wheel to apply a large corrective steering to the vehicle 100 in an inward direction (or also referred to as the first direction) of the lane 300. Accordingly, the steering angular speed of the vehicle 100 may suddenly change to a large value, and the vehicle 100 may identify a first change amount (also referred to as the first maximum change amount) of the steering angular speed suddenly changed to the large value. Furthermore, the most of the drivers manipulate the steering wheel to apply the large corrective steering to the vehicle 100, and then additionally manipulate the steering wheel so that the vehicle 100 can drive straight to a center portion of a road to provide the vehicle 100 with additional corrective steering in the outward direction (also referred to as the second direction) of the lane 300. Accordingly, the vehicle 100 may identify a second change amount (or also referred to as the second maximum change amount) of the steering angular speed of the vehicle 100.

When a change in the steering angular speed of the vehicle 100 according to the driver's driving as illustrated in FIG. 3 is illustrated as a graph, it may have a shape as illustrated in FIG. 4. Referring to FIG. 4, the steering angular speed of the vehicle 100 may be the same as section A while the vehicle 100 moves in the direction away from the lane 300 and the vehicle 100 attempts to leave the lane 300 or the vehicle 100 moves in the direction away from the vehicle 100. Thereafter, when there is the large correction steering of the vehicle 100, the steering angular speed of the vehicle 100 according to the large correction steering may be the same as section B. Thereafter, when there is an additional correction steering of the vehicle 100, the steering angular speed of the vehicle 100 according to the additional correction steering may be the same as section C.

The vehicle 100 may identify whether the driver's driving of the vehicle 100 is careless driving based on the change amount in the steering angular speed of the vehicle 100 (203).

The vehicle 100 may identify that the driver's driving of the vehicle 100 is careless driving according to the driver's driving as illustrated in FIG. 3 or according to the change amount in the identified steering angular speed as illustrated in FIG. 4. For example, when identifying the first maximum change amount (steering angular speed in section A−steering angular speed in section B) in which the steering angular speed of the vehicle 100 as illustrated in FIG. 4 changes in the first direction and the second maximum change amount (steering angular speed in section B−steering angular speed in section C) in which the steering angular speed of the vehicle 100 changes in the second direction thereof, the vehicle 100 may identify the driver's careless driving of the vehicle 100.

The vehicle 100 may identify whether the change amount in the steering angular speed of the vehicle 100 exceeds a first threshold value depending on a current speed of the vehicle 100.

The vehicle 100 may determine the first threshold value depending on the current speed of the vehicle 100 based on the current speed of the vehicle 100, a predetermined first steering angular speed threshold value corresponding to a predetermined first speed of the vehicle 100, a predetermined second steering angular speed threshold value corresponding to a predetermined second speed of the vehicle 100, and a predetermined second speed. For example, as the speed of the vehicle 100 is lower, the behavior of the vehicle according to the change of the steering wheel value is dull, and accordingly, the first threshold value may have a larger value. As the speed of the vehicle 100 increases, the behavior of the vehicle according to the change of the steering wheel value is sensitive, and accordingly, the second threshold value may have a small value. For example, the first predetermined speed may be a low speed (e.g., 10 km/h), and the second predetermined speed may be the maximum speed (e.g., 90 to 100 km/h) of the vehicle 100. For example, the vehicle 100 may determine the first threshold value corresponding to the current speed of the vehicle 100 based on Equation 1 below.

$$\text{peak}SAS\_\text{Speed}Th = -((\text{PeakMax}SAS - \text{PeakMin}SAS)/\text{VehMaxSpeed}) \times \text{CurrentVehSpeed} + \text{PeakMax}SAS \quad \text{[Equation 1]}$$

(peakSAS_SpeedTh: first threshold value, PeakMaxSAS: the predetermined first steering angular speed threshold value corresponding to the predetermined first speed of the vehicle 100, PeakMinSAS: the predetermined second steering angular speed threshold value corresponding to the predetermined second speed of the vehicle 100, Veh- MaxSpeed: the predetermined second speed, CurrentVehSpeed: the current speed of the vehicle 100)

The vehicle 100 may identify whether the change amount in the steering angular speed of the vehicle 100 exceeding the first threshold value depending on the current speed of the vehicle 100 occurs at least twice in succession, that is, the second maximum change amount (steering angular speed in section B-steering angular speed in section C) occurs after the first maximum change amount (steering angular speed in section A-steering angular speed in section B). For example, the vehicle 100 may identify whether the first maximum change amount (steering angular speed in section A-steering angular speed in section B) exceeds the first threshold value, and then, the vehicle 100 may identify whether the second maximum change amount (steering angular speed in section B-steering angular speed in section C) exceeds the first threshold value.

The vehicle 100 may identify whether the second maximum change amount (steering angular speed in section B-steering angular speed in section C) is greater than or equal to a multiple of the second threshold value of the first change amount (steering angular speed in section A-steering angular speed in section B). For example, referring to FIG. 4, the vehicle 100 may identify whether a condition of (steering angular speed in section C-steering angular speed in section B)>=(steering angular speed in section B-steering angular speed in section A)×D (D is the second threshold (e.g., D=1.3)) is satisfied. When the second maximum change amount is greater than or equal to the multiple of the second threshold value of the first change amount, the vehicle 100 may identify that the driver of the vehicle 100 is driving carelessly.

Figure 5:
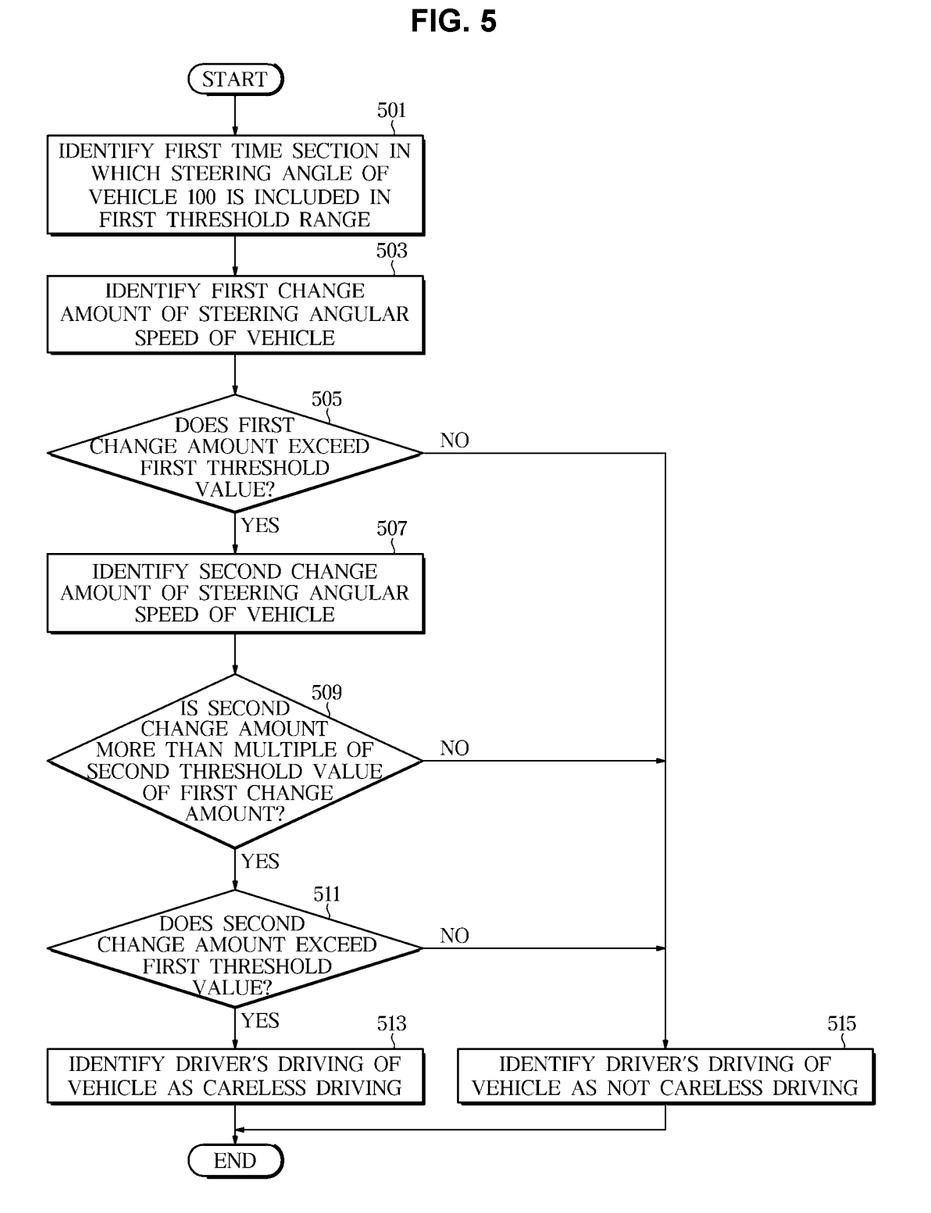
FIG. 5 is a flowchart of a vehicle control operation according to various exemplary embodiments of the present invention.
Figure 6:
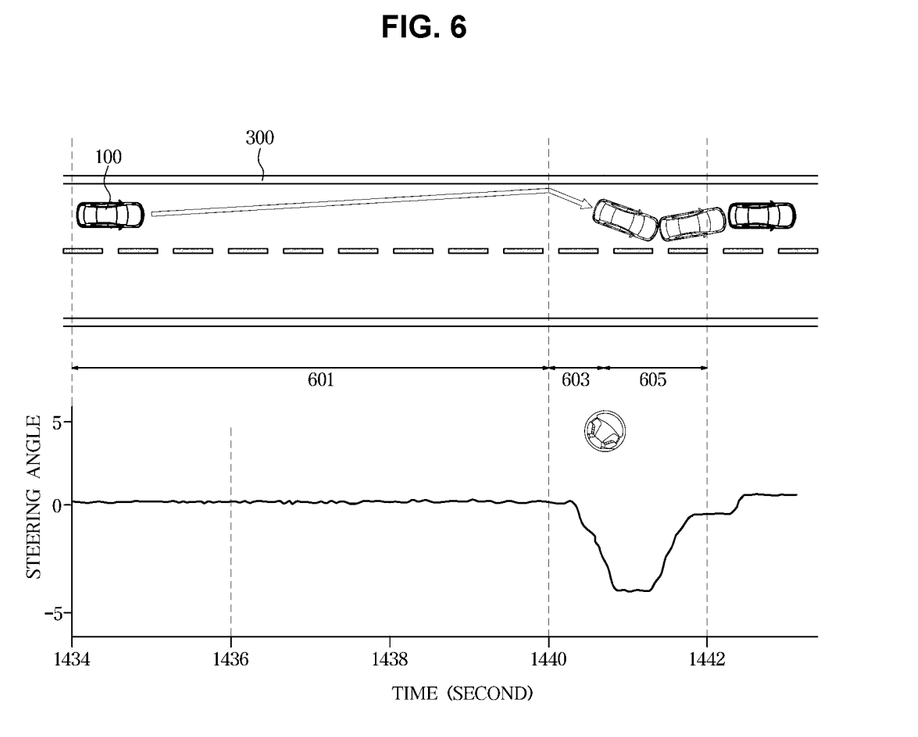
FIG. 6 is a view for describing careless driving of a driver of a vehicle according to various exemplary embodiments of the present invention.

FIG. 5 is a flowchart of a vehicle control operation according to various exemplary embodiments of the present invention, and FIG. 6 is a view for describing careless driving of a driver of a vehicle according to various exemplary embodiments of the present invention.

The vehicle 100 may identify a first time section in which the steering angle of the vehicle 100 is included in a first threshold range (501).

Referring to FIG. 6, the vehicle 100 may identify a first time section 601 in which the steering angle of the vehicle 100 while driving is included in the predetermined first threshold range. The predetermined first threshold range may generally be a range of a small steering angle of the vehicle 100 which may occur when the vehicle 100 is driving normally. The first time section 601 may be a time section in which the steering angle of the vehicle 100 being driven is greater than or equal to a predetermined threshold time and is included in the first threshold range. For example, during the first time section 601, the vehicle 100 may move in the direction deviating from the lane 300 as illustrated in FIG. 6, and the steering angle of the driving vehicle 100 may be included in the first threshold range.

The vehicle 100 may identify the first change amount of the steering angular speed of the vehicle 100 (503).

The vehicle 100 may identify whether the first change amount of the vehicle 100 exceeds the first threshold value (505).

The vehicle 100 may perform operation 507 when the first change amount of the steering angular speed of the vehicle 100 exceeds the first threshold value, and otherwise perform operation 511.

The first change amount of the steering angular speed of the vehicle 100 may be referred to as the first maximum change amount in an external direction of the lane 300, for example, in the first direction.

Referring to FIG. 6, the vehicle 100 may identify the first change amount of the steering angular speed of the vehicle 100 while driving for more than the predetermined threshold time in a state in which the steering angle of the vehicle 100 is included in the preset first threshold range, and identify an occurrence of the second time section 603 including the first change amount. For example, while the vehicle 100 is driving without manipulating the steering wheel of the vehicle 100, when the driver of the vehicle 100 manipulates the steering wheel, the large correction steering of the vehicle 100 may occur, and accordingly, the vehicle 100 may identify a sudden change in a large steering angular speed, that is, the second time section 603 that includes the first change amount. The change in the large steering angular speed of the vehicle 100 may be determined whether or not the first threshold value is exceeded. For example, while the vehicle 100 is driving, the vehicle 100 may identify whether the second time section 603 occurs in which the first change amount of the steering angular speed of the vehicle 100 exceeds the first threshold value corresponding to the current speed of the vehicle 100. For example, the vehicle 100 may determine the first threshold value corresponding to the current speed based on Equation 1 described above.

The vehicle 100 may identify the second change amount of the steering angular speed of the vehicle 100 (507).

The second change amount of the steering angular speed of the vehicle 100 may be referred to as the second maximum change amount in an internal direction of the lane 300, for example, in the second direction.

The vehicle 100 may identify whether the second change amount of the steering angular speed of the vehicle 100 is greater than or equal to the multiple of the second threshold value of the first change amount (509).

The vehicle 100 may perform operation 511 when the second change amount of the steering angular speed of the vehicle 100 is greater than or equal to the multiple of the second threshold value, and otherwise perform operation 515.

The vehicle 100 may identify whether the second change amount of the steering angular speed of the vehicle 100 exceeds the first threshold value (511).

The vehicle 100 may perform operation 513 when the second change amount of the steering angular speed of the vehicle 100 exceeds the first threshold value, and otherwise perform operation 515.

The vehicle 100 may identify the second change amount of the steering angular speed of the vehicle 100 after the first change amount of the steering angular speed of the vehicle 100.

Referring to FIG. 6, the vehicle 100 may identify an occurrence of a third time section 605 that includes the second change amount of the steering angular speed of the vehicle 100 immediately after the second time section 603 including the first change amount of the steering angular speed of the vehicle 100.

For example, after the occurrence of the large correction steering of the vehicle 100 due to the driver's steering wheel manipulation of the vehicle 100, the driver may perform additional manipulation of the steering wheel to further correct the steering of the vehicle 100, and additional correction steering of the vehicle 100 may occur according to the additional manipulation of the steering wheel. Accordingly, the vehicle 100 may identify the change in the additional steering angular speed after the sudden change in the large steering angular speed, and identify the third time section 605 that includes the change in the additional steering angular speed, that is, the occurrence of the third time section 605. The change of the additional steering angular speed may be determined based on whether the above-described first threshold value is exceeded and the second threshold value.

The vehicle 100 may identify that driving of the driver of the vehicle 100 is the careless driving (513).

In a response to identifying that the second change amount of the steering angular speed of the vehicle 100 exceeds the first threshold value, the vehicle 100 may identify that the driver's driving of the vehicle 100 is careless driving. For example, the vehicle 100 may identify that the driver's driving is careless driving in a response to the occurrence of the third time section 605. For example, in a response to the occurrence of the third time section 605, the vehicle 100 may identify that the driver's driving pattern is the excessive steering pattern, and thus identify that the driver's driving is careless driving.

The vehicle 100 may identify that driving of the driver of the vehicle 100 is not careless driving.

Meanwhile, in the exemplary embodiment of FIG. 5, it has been described that operation 509 after operation 507, operation 511 after operation 509, and operation 513 or 515 after operation 511 are performed, but according to another exemplary embodiment of the present invention, after operation 507, operations 509 and 511 may be simultaneously performed, and then operation 513 or 515 may be performed.

For example, the vehicle 100 may identify whether the conditions of whether the second change amount is greater than or equal to the multiple of the second threshold of the first change amount (509) and whether the second change amount exceeds the first threshold value (511) are both satisfied. When both conditions are satisfied, the vehicle 100 may perform operation 513, otherwise, operation 515 may be performed. According to another exemplary embodiment of the present invention, operation 511 after operation 507, operation 509 after operation 511, and operation 513 or 515 after operation 509 may be performed. For example, after identifying the second change amount of the steering angular velocity of the vehicle 100 (507), the vehicle 100 may identify whether the second change amount exceeds the first threshold value (511). When the second change amount exceeds the first threshold value, the vehicle 100 may perform operation 509, otherwise, operation 515 may be performed. When the second change amount exceeds the first threshold value, the vehicle 100 may identify whether the second change amount is greater than or equal to the multiple of the second threshold of the first change amount. When the second change amount is greater than or equal to the multiple of the second threshold of the first change amount, the vehicle 100 may perform operation 513, otherwise, operation 515 may be performed.

According to the above-described embodiment, the vehicle 100 may further identify re-correction steering of the vehicle 100 after identifying the large correction steering to the vehicle 100, reducing erroneous detection of the driving pattern in which the driver's driving may be recognized as careless driving. For example, although some drivers drive normally, the vehicle 100 may erroneously detect the driver's driving pattern as the excessive steering pattern according to road conditions or driver's driving habits. The vehicle 100 to which the above-described embodiment is applied may minimize an error of erroneously detecting the driver's driving pattern as the excessive steering pattern.

Furthermore, according to the above-described embodiment, the first threshold value and the second threshold value of the vehicle 100 may be regarded as important factors configured for discriminating that excessive steering of the vehicle 100 has occurred. Accordingly, the first threshold value and the second threshold value may be determined through simulation and tuning using the vehicle 100. For example, in a method of determining the first threshold value and the second threshold value, tuning is performed so that the excessive steering is detected well by first setting the first threshold value low, and then tuning may be performed in a direction to prevent erroneous detection with the second threshold value. For example, on a test road (e.g., highway, national highway, etc.), first, the driver may drive with caution so that the vehicle 100 performs a normal driving, and the vehicle 100 may perform data logging from a moment when the normal is performed. During the normal driving of the vehicle 100, the driver may drive the vehicle 100 so that the vehicle 100 generates the excessive steering pattern. For example, the driver manipulates the steering wheel so that the vehicle 100 leaves the lane while the driver does not move the steering wheel, and then the vehicle 100 suddenly returns to an original lane so that the vehicle 100 can return to the original lane. The vehicle 100 may record a time from a driving point of the vehicle 100 for the vehicle 100 to generate the excessive steering pattern. While repeating the driving that generates the excessive steering pattern from the normal driving of the vehicle 100 at various speeds and various roads, the vehicle 100 may collect data while recording the time from the driving point of the vehicle 100 to generate the excessive steering pattern of the vehicle 100. Through simulation of data collected in excess of a certain amount, the vehicle 100 may tune the first threshold value and the second threshold value, and then change the first threshold value to identify whether all excessive steering patterns are included in a desired place. When the first threshold value is determined, tuning of the second threshold value may be started. For example, when the second threshold is lowered, the excessive steering pattern may be detected in addition to the driving point that simulates excessive steering. When the second threshold is increased, the excessive steering pattern is not detected at a driving point that simulates excessive steering. Since the second threshold is effective in preventing erroneous detection, the first threshold value is usually tuned sensitively so that the excessive steering at the desired point occurs, and by changing the second threshold value, the tuning may be performed so that the excessive steering does not occur in unwanted places. The first threshold value and the second threshold value tuned in the instant way may be stored in the memory 110 of the vehicle 100.

According to the vehicle and the method of controlling the vehicle according to an aspect, by improving the performance of the conventional DAW technology, it is possible to improve the reliability of the driver's careless driving determination.

The disclosed exemplary embodiments may be implemented in a form of a recording medium storing computer-executable instructions that are executable by a processor. The instructions may be stored in a form of a program code, and when executed by a processor, the instructions may generate a program module to perform operations of the included exemplary embodiments. The recording medium may be implemented non-transitory as a non-transitory computer-readable recording medium.

The non-transitory computer-readable recording medium may include all types of recording media storing commands which may be interpreted by a computer. For example, the non-transitory computer-readable recording medium may be, for example, ROM, RAM, a magnetic tape, a magnetic disc, flash memory, an optical data storage device, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
    a steering angle sensor; and
    a controller configured to be electrically connected to the steering angle sensor,
    wherein the controller is configured to:
        identify a change amount in a steering angular speed of the vehicle according to an output of the steering angle sensor, and
        identify careless driving of a driver of the vehicle according to a first maximum change amount in which the steering angular speed changes in a first direction and a second maximum change amount in which the steering angular speed changes in a second direction.

2. The vehicle according to claim 1,
    wherein the output of the steering angle sensor includes a steering angle of the vehicle, and
    wherein the controller is configured to identify whether the steering angle of the vehicle is included in a first threshold range for a predetermined threshold time or more than the predetermined threshold time according to the output of the steering angle sensor while the vehicle is driving.

3. The vehicle according to claim 2, wherein, after the steering angle of the vehicle is included in the first threshold range for the predetermined threshold time or more than the predetermined threshold time, the controller is configured to identify that a driving of the vehicle by the driver is the careless driving according to the first maximum change amount of the steering angular speed of the vehicle exceeding a first threshold value depending on a current speed of the vehicle.

4. The vehicle according to claim 3, wherein, after the first maximum change amount of the steering angular speed of the vehicle, which exceeds the first threshold value depending on the current speed of the vehicle, the controller is configured to identify that the driver's driving is the careless driving in a response to the second maximum change amount of the steering angular speed of the vehicle exceeding the first threshold value depending on the current speed of the vehicle.

5. The vehicle according to claim 4, wherein the first threshold value is determined according to the current speed of the vehicle, a predetermined first steering angular speed threshold value corresponding to a predetermined first speed of the vehicle, a predetermined second steering angular speed threshold value corresponding to a predetermined second speed of the vehicle, and the predetermined second speed.

6. The vehicle according to claim 4, wherein the first threshold value is determined according to an equation 1:

the first threshold value=−((the predetermined first steering angular speed threshold value corresponding to the predetermined first speed of the vehicle−the predetermined second steering angular speed threshold value corresponding to the predetermined second speed of the vehicle)/the predetermined second speed)×the current speed of the vehicle+the predetermined first steering angular speed threshold value corresponding to the predetermined first speed of the vehicle        Equation 1.

7. The vehicle according to claim 4, wherein the second maximum change amount is greater than or equal to a multiple of a second threshold value of the first maximum change amount.

8. The vehicle according to claim 1, further including an output device controlled by the controller to output information for warning the driver's attention when the controller identifies the careless driving of the driver.

9. A method of controlling a vehicle, the method including:
    identifying, by a controller, a change amount in a steering angular speed of the vehicle; and
    identifying, by the controller, careless driving of a driver of the vehicle according to a first maximum change amount in which the steering angular speed changes in a first direction and a second maximum change amount in which the steering angular speed changes in a second direction.

10. The method according to claim 9, further including:
    identifying, by the controller, whether a steering angle of the vehicle is included in a first threshold range for a predetermined threshold time or more while the vehicle is driving,
    wherein the identifying of the change amount in the steering angular speed of the vehicle includes:
    performing the identifying of the change amount after the steering angle of the vehicle is included in the first threshold range for the predetermined threshold time or more than the predetermined threshold time.

11. The method according to claim 10, wherein the identifying of careless driving includes:
    after the steering angle of the vehicle is included in the first threshold range for the predetermined threshold time or more than the predetermined threshold time, performing the identifying of careless driving based on the first maximum change amount of the steering angular speed of the vehicle exceeding a first threshold value depending on a current speed of the vehicle.

12. The method according to claim 11, wherein the identifying of careless driving further includes:
    after the first maximum change amount of the steering angular speed of the vehicle, which exceeds the first threshold value depending on the current speed of the vehicle, performing the identifying of careless driving in a response to the second maximum change amount of the steering angular speed of the vehicle exceeding the first threshold value depending on the current speed of the vehicle.

13. The method according to claim 12, wherein the first threshold value is determined according to the current speed of the vehicle, a predetermined first steering angular speed threshold value corresponding to a predetermined first speed of the vehicle, a predetermined second steering angular speed threshold value corresponding to a predetermined second speed of the vehicle, and the predetermined second speed.

14. The method according to claim 13, wherein the first threshold value is determined according to an equation 1:

$$\text{the first threshold value} = -((\text{the predetermined first steering angular speed threshold value corresponding to the predetermined first speed of the vehicle} - \text{the predetermined second steering angular speed threshold value corresponding to the predetermined second speed of the vehicle}) / \text{the predetermined second speed}) \times \text{the current speed of the vehicle} + \text{the predetermined first steering angular speed threshold value corresponding to the predetermined first speed of the vehicle} \quad \text{Equation 1.}$$

15. The method according to claim 12, wherein the second maximum change amount is greater than or equal to a multiple of a second threshold value of the first maximum change amount.

16. The method according to claim 9, further including:
outputting information for warning the driver's attention, by an output device controlled by the controller when the controller identifies the careless driving of the driver.

17. A non-transitory computer readable storage medium on which a program for performing the method of claim 9 is recorded.

* * * * *